United States Patent
Yang et al.

(10) Patent No.: US 12,488,174 B2
(45) Date of Patent: Dec. 2, 2025

(54) SEGMENTATION METHOD FOR PATH ROUTING IN MULTILAYER STRUCTURE AND APPARATUS USING THE SAME

(71) Applicant: SAMSUNG SDS CO., LTD., Seoul (KR)

(72) Inventors: Jaeho Yang, Seoul (KR); Namkyeong Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 654 days.

(21) Appl. No.: 17/973,974

(22) Filed: Oct. 26, 2022

(65) Prior Publication Data

US 2023/0137941 A1    May 4, 2023

(30) Foreign Application Priority Data

Oct. 29, 2021    (KR) .................. 10-2021-0146977

(51) Int. Cl.
*G06F 30/3947*    (2020.01)
(52) U.S. Cl.
CPC .............................. *G06F 30/3947* (2020.01)
(58) Field of Classification Search
CPC .................................................. G06F 30/3947
USPC ........................................................ 716/129
See application file for complete search history.

(56) References Cited

U.S. PATENT DOCUMENTS

| | | | | |
|---|---|---|---|---|
| 6,415,422 B1* | 7/2002 | Mehrotra | .............. | G06F 30/367 |
| | | | | 716/129 |
| 7,143,382 B2* | 11/2006 | Teig | ...................... | G06F 30/394 |
| | | | | 716/129 |
| 8,473,889 B2* | 6/2013 | Xia | ........................ | G06F 30/394 |
| | | | | 716/126 |
| 8,694,944 B1* | 4/2014 | Soo | ....................... | G06F 30/347 |
| | | | | 716/110 |
| 10,643,014 B1* | 5/2020 | Meyer | .................... | G06F 30/394 |
| 2003/0063568 A1* | 4/2003 | Teig | ...................... | G06F 30/394 |
| | | | | 370/254 |
| 2006/0156266 A1* | 7/2006 | Alpert | .................... | G06F 30/394 |
| | | | | 716/129 |
| 2007/0028201 A1* | 2/2007 | Mehrotra | .............. | G06F 30/394 |
| | | | | 716/135 |

(Continued)

FOREIGN PATENT DOCUMENTS

KR    10-2021-0004779 A    1/2021

*Primary Examiner* — Suchin Parihar
(74) *Attorney, Agent, or Firm* — Sughrue Mion, PLLC (57) ABSTRACT

A segmentation method includes generating an individual multilayer grid map for each of connection target groups corresponding to a multilayer structure and includes an initial probability included in a path routing area of a corresponding connection target group, among connection target groups in the multilayer structure, as a value of a grid cell, updating the individual multilayer grid map, based on routability of the corresponding connection target group, generating an integrated multilayer grid map including, as a value of a grid cell, a probability that each grid cell is included in a path routing area of each of the connection target groups based on the updated individual multilayer grid map for each of the connection target groups, and determining a path routing area of each of the of connection target groups in each layer in the multilayer structure based on the integrated multilayer grid map.

16 Claims, 6 Drawing Sheets

(56) References Cited

U.S. PATENT DOCUMENTS

| | | | |
|---|---|---|---|
| 2007/0101303 A1* | 5/2007 | Lien | G06F 30/398 |
| | | | 716/54 |
| 2011/0156103 A1* | 6/2011 | Penzes | H10D 89/10 |
| | | | 438/129 |
| 2015/0020038 A1* | 1/2015 | Feng | G06F 30/392 |
| | | | 716/103 |
| 2019/0188353 A1* | 6/2019 | Correale, Jr. | G06F 30/3312 |
| 2021/0003397 A1 | 1/2021 | Seong et al. | |
| 2022/0245315 A1* | 8/2022 | Gort | G06F 30/34 |
| 2024/0386182 A1* | 11/2024 | Yang | G06N 3/045 |

\* cited by examiner

SEGMENTATION METHOD FOR PATH ROUTING IN MULTILAYER STRUCTURE AND APPARATUS USING THE SAME

CROSS-REFERENCE TO RELATED APPLICATION AND CLAIM OF PRIORITY

This application claims the benefit under 35 USC § 119 Korean Patent Application No. 10-2021-0146977 filed on Oct. 29, 2021 in the Korean Intellectual Property Office, the disclosure of which is incorporated herein by reference in its entirety.

BACKGROUND

1. Field

The present disclosure relates to path routing technologies within a multilayer structure.

2. Description of Related Art

Related prior art methods for routing paths in multilayer structures, such as semiconductor packages, are performed by design experts through a process of manually connecting design objects to be connected according to the design rules of the objects over tens to hundreds of hours using specialized electronic design automation (EDA) tools.

In order to automate such a process, sequential pipelines, such as planning, connecting, and re-planning and re-connecting if there is no space at all, are automatically executed to arrange paths in a multilayer structure so that hundreds to tens of thousands of connection objects that need to be connected do not overlap each other.

In the related art for automating path routing in a multilayer structure, the entire area is divided equally to have specific sizes (e.g., 500×500) and a routing (wiring operation) operation is performed by attempting to path in a direction from a start point to an end point based on the positions of the start point and end point, and if a routing path overlaps another routing path, it is determined whether to move to another layer through a via hole near the overlapping path, and a routing path connection is performed so that the whole path is connected.

The problems of the related art are that overlap occurs frequently in a dense space, which increases the number of VIAs, lengthens the overall routing path, and makes it difficult to create an overall optimal routing path. Accordingly, rather than a uniform equal division method, an improved method is needed to create an overall optimized routing path by allocating an appropriate routing space according to a situation of a connection target group including start and end points to be connected.

SUMMARY

Exemplary embodiments provide a segmentation method and apparatus for path routing in a multilayer structure.

According to an aspect of the present disclosure, a segmentation method includes: generating an individual multilayer grid map for each of a plurality of connection target groups corresponding to a multilayer structure and includes an initial probability of being included in a path routing area of a corresponding connection target group, among a plurality of connection target groups in the multilayer structure, as a value of a grid cell; updating the individual multilayer grid map for each of the plurality of connection target groups based on routability of the corresponding connection target group; generating an integrated multilayer grid map including, as a value of a grid cell, a probability that each grid cell is included in a path routing area of each of the plurality of connection target groups based on the updated individual multilayer grid map for each of the plurality of connection target groups; and determining a path routing area of each of the plurality of connection target groups in each layer in the multilayer structure based on the integrated multilayer grid map.

The segmentation method may further include: after generating the integrated multilayer grid map, iteratively performing the operation of generating a feedback value for each of the plurality of connection target groups based on the integrated multilayer grid map, additionally updating the individual multilayer grid map for each of the plurality of connection target groups based on the feedback value and the routability, and updating the integrated multilayer grid map, based on the additionally updated individual multilayer grid map for each of the plurality of connection target groups, one or more times, wherein the determining of the path routing area includes determining the path routing area of each of the plurality of connection target groups in each layer in the multilayer structure based on the integrated multilayer grid map updated by the iterative performance.

The feedback value for a specific connection target group, among the plurality of connection target groups, may include a probability that each grid cell in an individual multilayer grid map for the specific connection target group is included in a path routing area of the specific connection target group and a probability that each grid cell in an individual multilayer grid map for the specific connection target group is included in a path routing area of the remaining connection target groups.

The updating may include calculating the routability using an automatic routing agent and updating a value of each grid cell in the individual multilayer grid map for each of the plurality of connection target groups so that the routability for the corresponding connection target group is improved.

The individual multilayer grid map may include, as a value of the grid cell, a probability that each grid cell is included in a path routing area of the corresponding path routing group and a probability that each grid cell is included in a path routing area of the remaining path routing groups excluding the corresponding path routing group.

The generating of the integrated multilayer grid map may include extracting values of grid cells at the same location as that of each grid cell included in the integrated multilayer grid map from each updated individual multilayer grid map for each of the plurality of connection target groups, integrating the extracted values of the grid cells, and determining the value of each grid cell included in the integrated multilayer grid map based on the integrated values of the grid cells.

The generating of the integrated multilayer grid map may include determining the value of each grid cell included in the integrated multilayer grid map so that a boundary value of the path routing area allocated to each of the plurality of connection target groups is maximized, when each grid cell in the integrated multilayer grid map is allocated to a path routing area, among the plurality of connection target groups, based on the value of each grid cell included in the integrated multilayer grid map.

The generating of the individual multilayer grid map may include determining the initial probability based on positions of components included in the corresponding connection target group and positions of components included in each of the remaining connection target groups, among a plurality of components included in the multilayer structure.

According to another aspect of the present disclosure, a segmentation apparatus includes: one or more processors; and a memory storing one or more programs configured to be executed by the one or more processors, wherein the one or more processors generate an individual multilayer grid map for each of a plurality of connection target groups corresponding to a multilayer structure and including an initial probability of being included in a path routing area of a corresponding connection target group, among a plurality of connection target groups in the multilayer structure, as a value of a grid cell, update an individual multilayer grid map for each of the plurality of connection target groups based on routability of the corresponding connection target group, generate an integrated multilayer grid map including, as a value of a grid cell, a probability that each grid cell is included in a path routing area of each of the plurality of connection target groups based on the updated individual multilayer grid map for each of the plurality of connection target groups, and determine a path routing area of each of the plurality of connection target groups in each layer in the multilayer structure based on the integrated multilayer grid map.

The one or more processors, after generating the integrated multilayer grid map, may generate a feedback value for each of the plurality of connection target groups based on the integrated multilayer grid map, additionally update an individual multilayer grid map for each of the plurality of connection target groups based on the feedback value and the routability, and update the integrated multilayer grid map, based on the additionally updated individual multilayer grid map for each of the plurality of connection target groups, wherein the one or more processors iteratively performs the operation of generating the feedback value, additionally updating, and the updating of the integrated multilayer grid map one or more times, and determine the path routing area of each of the plurality of connection target groups in each layer in the multilayer structure based on the integrated multilayer grid map updated by the iterative performance.

The feedback value for a specific connection target group, among the plurality of connection target groups, may include a probability that each grid cell in an individual multilayer grid map for the specific connection target group is included in a path routing area of the specific connection target group and a probability that each grid cell in an individual multilayer grid map for the specific connection target group is included in a path routing area of the remaining connection target groups.

The one or more processors may calculate the routability using an automatic routing agent and updating a value of each grid cell in the individual multilayer grid map for each of the plurality of connection target groups so that the routability for the corresponding connection target group is improved.

The individual multilayer grid map may include, as a value of the grid cell, a probability that each grid cell is included in a path routing area of the corresponding path routing group and a probability that each grid cell is included in a path routing area of the remaining path routing groups excluding the corresponding path routing group.

The one or more processors may extract values of grid cells at the same location as that of each grid cell included in the integrated multilayer grid map from each updated individual multilayer grid map for each of the plurality of connection target groups, integrating the extracted values of the grid cells, and determine the value of each grid cell included in the integrated multilayer grid map based on the integrated values of the grid cells.

The one or more processors may determine the value of each grid cell included in the integrated multilayer grid map so that a boundary value of the path routing area allocated to each of the plurality of connection target groups is maximized, when each grid cell in the integrated multilayer grid map is allocated to a path routing area, among the plurality of connection target groups, based on the value of each grid cell included in the integrated multilayer grid map.

The one or more processors may determine the initial probability based on positions of components included in the corresponding connection target group and positions of components included in each of the remaining connection target groups, among a plurality of components included in the multilayer structure.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Hereinafter, exemplary embodiments of the present disclosure are described with reference to the accompanying drawings. The following description is provided to aid in the comprehensive understanding of methods, devices, and/or systems disclosed in the particularities. However, the following description is merely exemplary and not provided to limit the present disclosure.

In the following description of the present disclosure, a detailed description of known functions and configurations incorporated herein will be omitted when it would make the subject matter of the present disclosure unclear. The terms used in the present specification are defined in consideration of functions used in the present disclosure, and may be changed according to the intent or conventionally used methods of clients, operators, and users. Accordingly, definitions of the terms should be understood on the basis of the entire description of the present specification. Terms used in the following description are merely provided to describe exemplary embodiments of the present disclosure and are not intended to be limiting of the inventive concept. As used herein, the singular forms "a," "an" and "the" are intended to include the plural forms as well, unless the context clearly indicates otherwise. It will be further understood that the terms "comprises" or "has" when used in this specification, specify the presence of stated features, integers, steps, operations, elements, or a portion or combination thereof, but do not preclude the presence or addition of one or more other features, integers, steps, operations, elements, or a portion or combination thereof.

Figure 1:
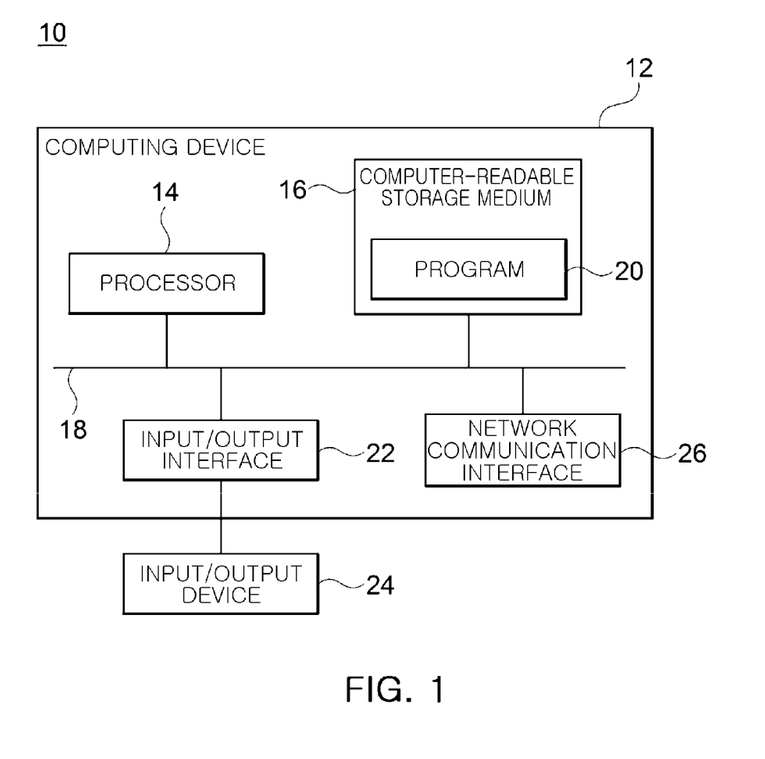
FIG. 1 is a block diagram illustrating a computing environment including a computing device suitable for use in exemplary embodiments.

FIG. 1 is a block diagram illustrating a computing environment 10 including a computing device suitable for use in exemplary embodiments. In the illustrated exemplary embodiment, each component may have different functions and capabilities other than those described below, and may include additional components in addition to those described below.

The illustrated computing environment 10 includes a computing device 12. In an exemplary embodiment, the computing device 12 may be a device for performing a segmentation method according to exemplary embodiments described below. The computing device 12 includes at least one processor 14, a computer-readable storage medium 16, and a communication bus 18. The processor 14 may cause the computing device 12 to operate according to the exemplary embodiments described above. For example, the processor 14 may execute one or more programs stored in the computer-readable storage medium 16. The one or more programs may include one or more computer-executable instructions that, when executed by the processor 14, causes the computing device 12 to perform operations according to the exemplary embodiment.

The computer-readable storage medium 16 is configured to store computer-executable instructions or program code, program data, and/or other suitable form of information. The program 20 stored in the computer-readable storage medium 16 includes a set of instructions executable by the processor 14. In an exemplary embodiment, the computer-readable storage medium 16 includes a memory (a volatile memory, such as random access memory, a non-volatile memory, or suitable combinations thereof), one or more magnetic disk storage devices, optical disk storage devices, flash memory devices, other forms of storage mediums that may be accessed by computing device 12 and store desired information, or suitable combinations thereof.

The communication bus 18 interconnects various other components of computing device 12, including the processor 14 and the computer-readable storage medium 16.

The computing device 12 may also include one or more input/output (I/O) interfaces 22 providing interfaces for one or more I/O devices 24 and one or more network communication interfaces 26. The I/O interface 22 and the network communication interface 26 are connected to the communication bus 18. The I/O device 24 may be connected to other components of the computing device 12 via the I/O interface 22. The I/O device 24 may include input devices such as pointing devices (such as computer mouses or trackpads), keyboards, touch input devices (such as touchpads or touchscreens), voice or sound input devices, various types of sensor devices, and/or imaging devices and/or output devices, such as display devices, printers, speakers, and/or network cards. The I/O device 24 may be included in the computing device 12, as a component constituting the computing device 12, and may be connected to the computing device 12, as a separate device distinct from the computing device 12.

Figure 2:
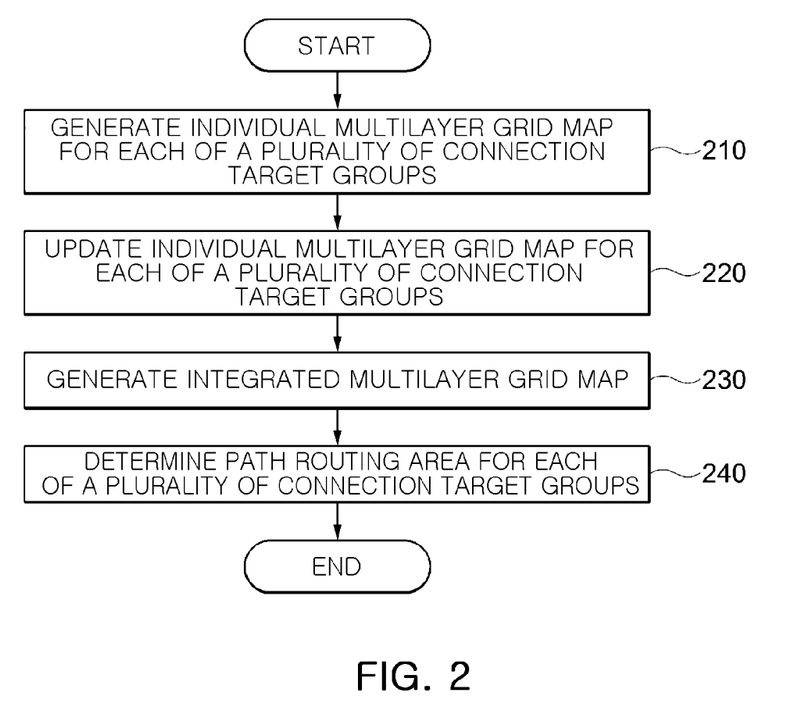
FIG. 2 is a flowchart of a segmentation method according to an exemplary embodiment.

FIG. 2 is a flowchart of a segmentation method according to an exemplary embodiment.

The method illustrated in FIG. 2 may be performed, for example, by the computing device 12 illustrated in FIG. 1.

Referring to FIG. 2, the computing device 12 generates an individual multilayer grid map for each of a plurality of connection target groups in a multilayer structure (210).

In this case, the multilayer structure refers to a three-dimensional (3D) structure including a plurality of layers. For example, the multilayer structure may be a building including a plurality of floors, a printed circuit board (PCB), a semiconductor package, and the like, but is not limited thereto.

Meanwhile, the plurality of connection target groups may refer to a set including one or more connection pairs, among a plurality of connection pairs, in a multilayer structure to be connected through path routing, respectively. In this case, the connection pair may be a pair of components in the multilayer structure that becomes a start point and an end point of a path to be generated through path routing in the multilayer structure, respectively. For example, when the multilayer structure is a semiconductor package, a start point of a path may be a bonding finger formed in the semiconductor package, and an end point of the path may be a solder ball to be connected to the corresponding bonding finger through a wiring in the semiconductor package. However, the start point and the end point included in the connection pair are not limited to the aforementioned example, and may be different depending on the type of the multilayer structure.

Meanwhile, according to an exemplary embodiment, the computing device 12 may generate a plurality of connection target groups by dividing the plurality of connection pairs in the multilayer structure into a plurality of groups according to a preset criterion. For example, the computing device 12 may divide connection pairs including start points disposed within a preset distance on the same layer in the multilayer structure based on positions, in the multilayer structure, of the start points included in each of the plurality of connection pairs to the same connection target group. However, the division criterion for generating a plurality of connection target groups is not limited to the aforementioned example, and may be set variously according to exemplary embodiments.

Meanwhile, the individual multilayer grid map for each of the plurality of connection target groups includes a per-layer grid map corresponding to each layer in the multilayer structure. The per-layer grid map may include a plurality of grid cells, and may include an initial probability of being included in a path routing area of a corresponding connection target group, among a plurality of connection target groups, as a value of each grid cell.

In this case, according to an exemplary embodiment, the initial probability may be determined based on positions of components included in the corresponding multilayer structure. For example, a value of a grid cell corresponding to positions of components included in a corresponding connection target group, among components included in the multilayer structure, may be set to 1.0, and a value of a grid cell corresponding to positions of components included in other connection target groups than the corresponding connection target group or a position of an obstacle that cannot be used for path routing in the multilayer structure may be set to 0. Also, a value of a grid cell corresponding to an area in which a component included in the multilayer structure is not located may be set to 0.5.

Figure 3:
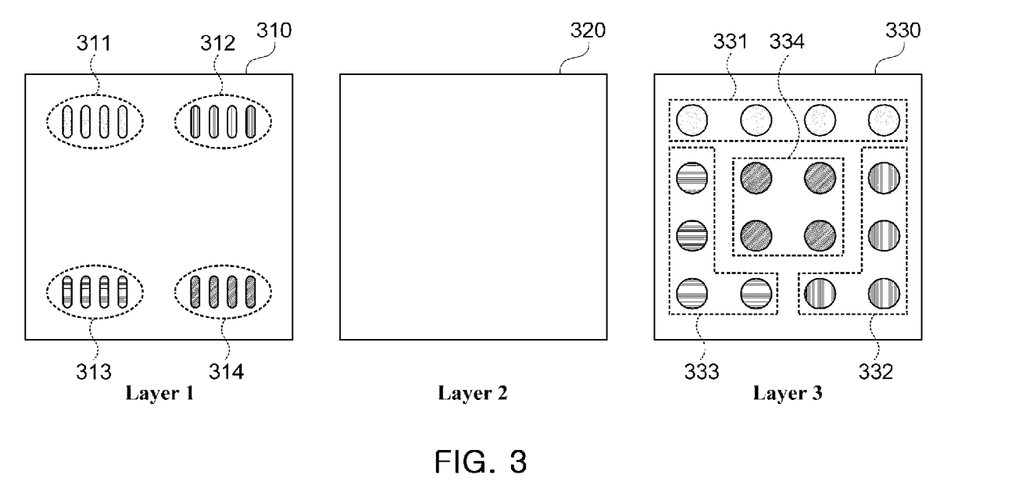
FIG. 3 is a view illustrating positions of a plurality of connection target groups on each layer of a multilayer structure.
Figure 4:
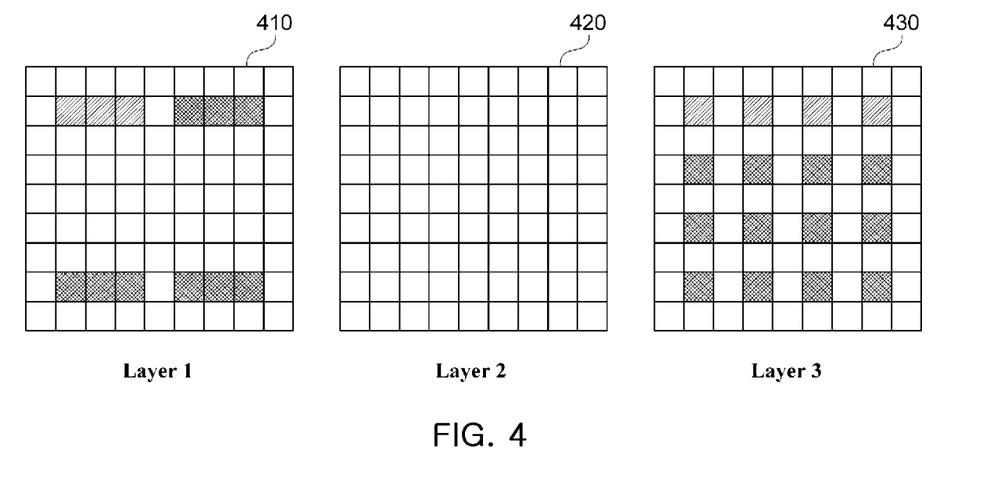
FIG. 4 is a view illustrating an example of an individual grid map for a connection target group, among a plurality of connection target groups, illustrated in FIG. 3.

FIG. 3 is a view illustrating positions of a plurality of connection target groups on each layer of a multilayer structure, and FIG. 4 is a view illustrating an example of an individual grid map for one connection target group, among a plurality of connection target groups illustrated in FIG. 3.

In the example illustrated in FIGS. 3 and 4, for convenience of description, it is assumed that a multilayer structure includes three layers (i.e., Layer 1 310, Layer 2 320, and Layer 3 330) and four connection target groups.

Specifically, referring to FIG. 3, a first connection target group includes four start points 311 arranged in Layer 1 310 and four end points 331 arranged in Layer 3 330, a second connection target group includes four path start points 312 arranged in Layer 1 310 and four end points 332 arranged in Layer 3 330, a third connection target group includes four path start points 313 arranged in Layer 1 310 and four end points 333 arranged in Layer 3 330, and a fourth connection target group includes four path start points 314 arranged in Layer 1 310 and four end points 334 arranged in Layer 3 330.

Meanwhile, FIG. 4 illustrates an example of an individual multilayer grid map for the first connection target groups 311 and 331 illustrated in FIG. 3.

Referring to FIGS. 3 and 4, the individual multilayer grid map for the first connection target group 311 and 331 may include per-layer grid maps 410, 420, and 430 respectively corresponding to the layers 310, 320, and 330 of the multilayer structure. Each of the grid maps 410, 420, and 430 includes a plurality of grid cells having the same size, and the size of each grid cell may be determined based on a preset constraint for path routing. For example, when the multilayer structure is a semiconductor package, the size of each grid cell may be determined based on a size of a via hole for wiring between each layer, a wiring width, a minimum distance between wirings, and the like. However, the criterion for determining the size of the grid cell is not limited thereto, and may be set variably, according to exemplary embodiments.

Meanwhile, the value of each grid cell included in each of the grid maps 410, 420, and 430 is included in the path routing area of the connection target group to which each grid cell may be a two-dimensional (2D) vector including a probability value that each grid cell is included in a route routing area of the corresponding connection target group (i.e., the first connection target group 311 and 331) and a probability value that each grid cell is included in the path routing area of the remaining connection target groups.

Specifically, in the example illustrated in FIG. 4, grid cells corresponding to the positions of the start points 311 and end points 331 of the first connection target group are marked with hatched lines, respectively, and grid cells corresponding to the positions of the start points 312, 313, and 314 and end points 332, 333, and 334 of the remaining connection target groups are marked in gray shades. Meanwhile, the value of each grid cell may be set as a 2D vector value having the form (this, others). In this case, 'this' represents the probability that each grid cell is included in the path routing area of the corresponding connection target group (i.e., the first connection target group), and 'others' represents the probability that each grid cell is included in a path routing area of a connection target group other than the corresponding connection target group. For example, values of grid cells indicated by the hatched lines may be initialized to (1.0, 0), respectively, and values of grid cells indicated by shades may be initialized to (0, 1.0). Also, the values of the remaining grid cells may be initialized to (0.5, 0.5).

Referring back to FIG. 2, the computing device 12 generates an individual multilayer grid map for each of a plurality of connection target groups, and then, updates the individual multilayer grid map for each of a plurality of connection target groups based on routability for the corresponding connection target group (220).

According to an exemplary embodiment, the routability may refer to a score calculated based on a path routing result using an automatic routing agent. In this case, for example, the automatic routing agent may refer to an algorithm for automatically performing path routing on a connection target group based on routing area information to be used for path routing of a specific connection target group, positions of components in the multilayer structure, constraints for path routing, and the like. As a specific example, the automatic routing agent may be an algorithm for performing path routing according to the method disclosed in Korean Patent Application Laid-Open No. 10-2021-0004779, but is not limited to a specific algorithm.

Meanwhile, the routability may be determined as a value greater than 0 when, for example, the automatic routing agent succeeds in path routing, and may be determined as 0 when the path routing fails.

Meanwhile, the computing device 12 may update the individual multilayer grid map for the corresponding specific connection target group by changing the value of each grid cell of the individual multilayer grid map so that the routability for the corresponding specific connection target group is improved based on a change in the routability when a specific grid cell in the individual multilayer grid map for the specific connection target group is used as a path routing area of the corresponding specific connection target group.

Thereafter, the computing device 12 generates an integrated multilayer grid map based on the updated individual multilayer grid map for each of the plurality of connection target groups (230).

In this case, the integrated multilayer grid map is configured to have the same form as that of the individual multilayer grid map, and may include a probability that each grid cell is included in a path routing area of each of a plurality of connection target groups, as a value of each grid cell. For example, if there are 4 connection target groups, the value of a specific grid cell in the integrated multilayer grid map may be a 4D vector including four values indicating a probability that the corresponding specific grid cell is included in the path routing area of each of the four connection target groups.

As a specific example, when there are four groups to be connected, the value of each grid cell included in the integrated multilayer grid map may be a 4D vector having a format of (P1, P2, P3, P4). In this case, P1 may indicate the probability that the grid cell will be included in the path routing area of the first connection target group, among the four connection target groups, P2 may indicate the probability that the grid cell will be included in the path routing area of the second connection target group, among the four connection target groups, P3 may indicate the probability that the grid cell will be included in the path routing area of the third connection target group, among the four connection target groups, and P4 may indicate the probability that the grid cell will be included in the path routing area of the fourth connection target group, among the four connection target groups. That is, if the value of a specific grid cell in the integrated multilayer grid map is (0.9, 0.05, 0.05, 0), the value may indicate that the probability that the corresponding specific grid cell will be included in the path routing area of the first connection target group is 90%, the probabilities that the corresponding specific grid cell will be included in the path routing areas of the second and third connection target groups are 5%, respectively, and the probability that the corresponding specific grid cell will be included in the path routing area of the fourth connection target group is 0%.

Meanwhile, according to an exemplary embodiment, the computing device 12 may extract a value of a grid cell at the same location as that of each grid cell included in the integrated multilayer grid map from each of the updated individual multilayer grid maps for each of the plurality of connection target groups, integrate the extracted values, and determine a value of each of the grid cells included in the integrated multilayer grid map based on the integrated value of the grid cells.

At this time, according to an exemplary embodiment, the computing device 12 may determine the value of each of the grid cells included in the integrated multilayer grid map so that a boundary value of the path routing area allocated to each connection target group is maximized when allocating each grid cell in the integrated multilayer grid map to one path routing area of the plurality of connection target groups based on the value of each of the grid cells. In this case, maximizing the boundary value may refer to determining the value of each grid cell so that the probability that the grid cells allocated to the path routing area of each connection target group will be included in the corresponding path routing area is maximized.

Thereafter, the computing device 12 determines a path routing area of each of the plurality of connection target groups in each layer in the multilayer structure based on the integrated multilayer grid map (240).

Specifically, the computing device 12 may determine a path routing area of each of the plurality of connection target groups by including an area in the multilayer structure corresponding to a grid cell in which a probability value to be included in the path routing area of the specific connection target group among the plurality of connection target groups is greater than a probability value to be included in each of the path routing areas of another connection target group based on the value of each grid cell in the integrated multilayer grid map, in the path routing area of the corresponding specific connection target group.

Figure 5:
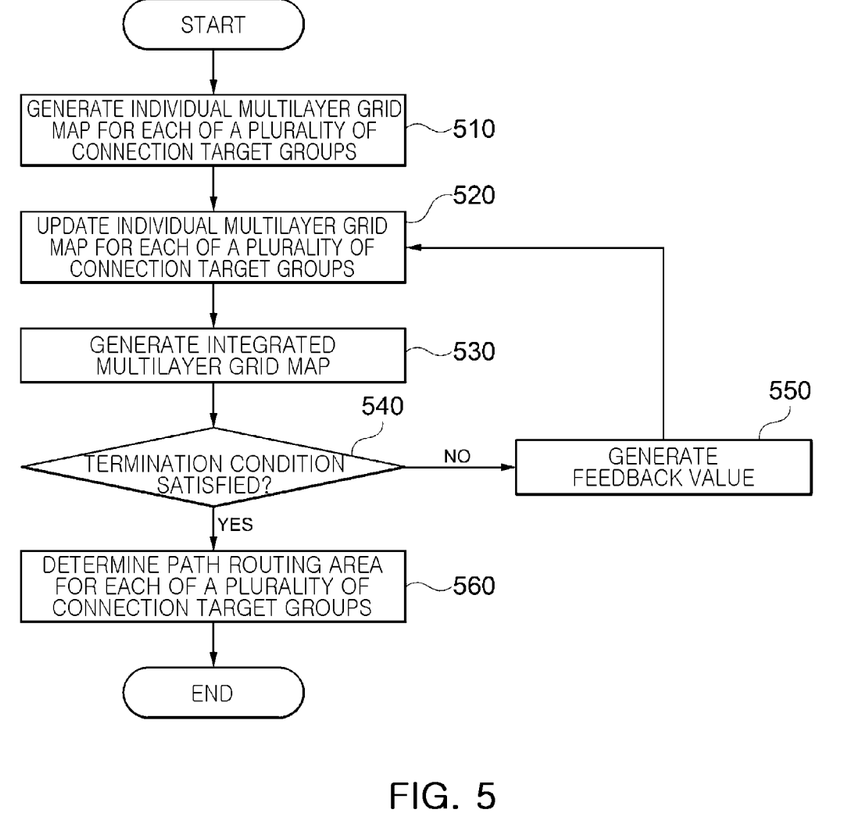
FIG. 5 is a flowchart of a segmentation method according to an additional exemplary embodiment.

FIG. 5 is a flowchart of a segmentation method according to an additional exemplary embodiment.

The method illustrated in FIG. 5 may be performed, for example, by the computing device 12 illustrated in FIG. 1.

Referring to FIG. 5, the computing device 12 generates an individual multilayer grid map for each of a plurality of connection target groups in the multilayer structure (510).

In this case, the individual multilayer grid map for each of the plurality of connection target groups includes a per-layer grid map corresponding to each layer in the multilayer structure. The per-layer grid map may include a plurality of grid cells, and may include an initial probability that each grid cell will be included in a path routing area of a corresponding connection target group, among the plurality of connection target groups, as a value of each grid cell.

Thereafter, the computing device 12 generates an individual multilayer grid map for each of a plurality of connection target groups, and then, updates the individual multilayer grid map for each of a plurality of connection target groups based on routability for the corresponding connection target group (520).

In this case, according to an exemplary embodiment, the routability may refer to a score calculated based on a path routing result using an automatic routing agent.

In addition, according to an exemplary embodiment, the computing device 12 may update the individual multilayer grid map for the corresponding specific connection target group by changing the value of each grid cell of the individual multilayer grid map so that the routability for the corresponding specific connection target group is improved based on a change in the routability when a specific grid cell in the individual multilayer grid map for the specific connection target group is used as a path routing area of the corresponding specific connection target group.

Thereafter, the computing device 12 generates an integrated multilayer grid map based on the updated individual multilayer grid map for each of the plurality of connection target groups (530).

Meanwhile, according to an exemplary embodiment, the computing device 12 may extract a value of a grid cell at the same location as that of each grid cell included in the integrated multilayer grid map from each of the updated individual multilayer grid maps for each of the plurality of connection target groups, integrate the extracted values, and determine a value of each of the grid cells included in the integrated multilayer grid map based on the integrated value of the grid cells.

At this time, according to an exemplary embodiment, the computing device 12 may determine the value of each of the grid cells included in the integrated multilayer grid map so that a boundary value of the path routing area allocated to each connection target group is maximized when allocating each grid cell in the integrated multilayer grid map to one path routing area of the plurality of connection target groups based on the value of each of the grid cells.

Thereafter, the computing device 12 determines whether a preset termination condition is satisfied (540).

At this time, the preset termination condition may be set such that an average value of the probability that the grid cells allocated to the path routing area of each connection target group will be included in the corresponding path routing area is greater than or equal to a preset threshold value (e.g., 0.9) or that probabilities that the grid cells allocated to the path routing area of each connection target group will be included in the corresponding path routing area are all equal to or greater than the preset threshold value. However, the termination condition is not limited thereto, and may be variably set according to exemplary embodiments.

Meanwhile, if the termination condition is not satisfied, the computing device 12 generates a feedback value for each of the plurality of connection target groups based on the integrated multilayer grid map (550), and update the individual multilayer grid map for each of the plurality of connection target groups based on the generated feedback value and the routability (520).

Specifically, the feedback value for a specific connection target group, among the plurality of connection target groups, includes the probability that each grid cell in the individual multilayer grid map for the specific connection target group will be included in the path routing area of the corresponding specific connection target group and the probability that each grid cell will be included in the path routing area of the remaining connection target group. For example, assuming that the value of a specific grid cell in the integrated multilayer grid map is (0.7, 0.2, 0.05, 0.05), a feedback value for a first connected target group of the corresponding specific grid cell may be (0.7, 0.3), and the feedback value for the second connection target group may be (0.2, 0.8). Also, the feedback values for each of the third connection target group and the fourth connection target group may be (0.05, 0.95).

Meanwhile, if it is determined in step 540 that the preset termination condition is satisfied, the computing device 12 determines a path routing area of each of the plurality of connection target groups in each layer in the multilayer structure based on the integrated multilayer grid map (560).

Specifically, the computing device 12 may determine a path routing area of each of the plurality of connection target groups by including an area in the multilayer structure corresponding to a grid cell in which a probability value to be included in the path routing area of the specific connection target group among the plurality of connection target groups is greater than a probability value to be included in each of the path routing areas of another connection target group based on the value of each grid cell in the integrated multilayer grid map, in the path routing area of the corresponding specific connection target group.

Figure 6:
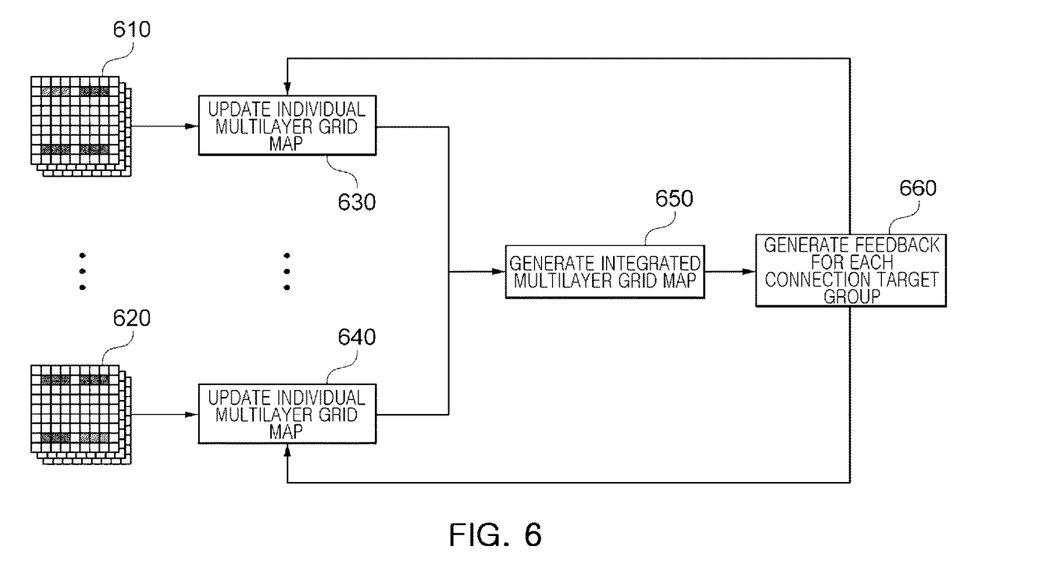
FIG. 6 is a diagram illustrating a process of generating an integrated multilayer grid map according to an exemplary embodiment.

FIG. 6 is a diagram illustrating a process of generating an integrated multilayer grid map according to an exemplary embodiment.

Referring to FIG. 6, the computing device 120 may update the individual multilayer grid maps 610 and 620 for each connection target group (630, 660). In this case, the updating of the individual multilayer grid map may be performed to improve the routability by the automatic routing agent through reinforcement learning using, for example, a deep neural network-based model.

Thereafter, the computing device 120 may generate an integrated multilayer grid map based on the updated individual multilayer grid map for each connection target group (650). In this case, the integrated multilayer grid map may be performed using, for example, a deep neural network-based model.

Thereafter, when the preset termination condition is not satisfied, the computing device 120 may generate a feedback value for each connection target group using the generated integrated multilayer grid map (660), and update the individual multilayer grid map for each connection target group again.

According to exemplary embodiments of the present disclosure, by dividing the areas in the multilayer structure into areas in an optimal state for routing, the routability of path routing may be improved and an optimized routing result may be generated.

While exemplary embodiments have been illustrated and described above, it will be apparent to those skilled in the art that modifications and variations could be made without departing from the scope of the present disclosure as defined by the appended claims.

What is claimed is:

1. A segmentation method performed by a computing device comprising at least one processor and a computer-readable storage medium storing one or more programs implemented by the at least one processor, the method comprising:
  generating an individual multilayer grid map for each of a plurality of connection target groups, the individual multilayer grid map corresponding to a multilayer structure comprising a plurality of connection target groups, the individual multilayer grid map including, as a value of a grid cell, an initial probability of being included in a path routing area of a corresponding connection target group, among the plurality of connection target groups in the multilayer structure;
  updating the individual multilayer grid map for each of the plurality of connection target groups, based on routability of the corresponding connection target group;
  generating an integrated multilayer grid map including, as the value of the grid cell, a probability that each grid cell is included in the path routing area of each of the plurality of connection target groups based on the updated individual multilayer grid map for each of the plurality of connection target groups; and
  determining the path routing area of each of the plurality of connection target groups in each layer in the multilayer structure based on the integrated multilayer grid map.

2. The segmentation method of claim 1, further comprising:
  after generating the integrated multilayer grid map, iteratively performing an operation comprising:
  generating a feedback value for each of the plurality of connection target groups, based on the integrated multilayer grid map,
  additionally updating the individual multilayer grid map for each of the plurality of connection target groups, based on the feedback value and the routability, and
  updating the integrated multilayer grid map, based on the additionally updated individual multilayer grid map for each of the plurality of connection target groups,
  wherein the determining of the path routing area includes determining the path routing area of each of the plurality of connection target groups in each layer in the multilayer structure, based on the integrated multilayer grid map updated by the iterative performance.

3. The segmentation method of claim 2, wherein the feedback value for a first connection target group, among the plurality of connection target groups, includes a probability that each grid cell in the individual multilayer grid map for the first connection target group is included in the path routing area of the first connection target group and a probability that each grid cell in the individual multilayer grid map for the first connection target group is included in a path routing area of remaining connection target groups.

4. The segmentation method of claim 1, wherein the updating includes calculating the routability using an automatic routing agent and updating the value of each grid cell in the individual multilayer grid map for each of the plurality of connection target groups to improve the routability for the corresponding connection target group.

5. The segmentation method of claim 1, wherein the individual multilayer grid map comprises, as the value of the grid cell, a probability that each grid cell is included in the path routing area of the corresponding path routing group and a probability that each grid cell is included in a path routing area of the remaining path routing groups excluding the corresponding path routing group.

6. The segmentation method of claim 1, wherein the generating of the integrated multilayer grid map includes:
  extracting values of grid cells at the same location as that of each grid cell included in the integrated multilayer grid map from each updated individual multilayer grid map for each of the plurality of connection target groups;
  integrating the extracted values of the grid cells; and
  determining the value of each grid cell included in the integrated multilayer grid map, based on the integrated values of the grid cells.

7. The segmentation method of claim 6, wherein the generating of the integrated multilayer grid map includes determining the value of each grid cell included in the integrated multilayer grid map so that a boundary value of the path routing area allocated to each of the plurality of connection target groups is maximized, when each grid cell in the integrated multilayer grid map is allocated to the path routing area, among the plurality of connection target groups, based on the value of each grid cell included in the integrated multilayer grid map.

8. The segmentation method of claim 1, wherein the generating of the individual multilayer grid map includes determining the initial probability, based on positions of components included in the corresponding connection target group and positions of components included in each of the remaining connection target groups, among a plurality of components included in the multilayer structure.

9. A segmentation apparatus comprising:
one or more processors; and
a memory storing one or more programs configured to be executed by the one or more processors,
wherein the one or more processors are configured to:
generate an individual multilayer grid map for each of a plurality of connection target groups, the individual multilayer grid map corresponding to a multilayer structure comprising a plurality of connection target groups, the individual multilayer grid map including, as a value of a grid cell, an initial probability of being included in a path routing area of a corresponding connection target group, among the plurality of connection target groups in the multilayer structure,
update an individual multilayer grid map for each of the plurality of connection target groups based on routability of the corresponding connection target group,
generate an integrated multilayer grid map including, as the value of the grid cell, a probability that each grid cell is included in the path routing area of each of the plurality of connection target groups based on the updated individual multilayer grid map for each of the plurality of connection target groups, and
determine the path routing area of each of the plurality of connection target groups in each layer in the multilayer structure based on the integrated multilayer grid map.

10. The segmentation apparatus of claim 9, wherein the one or more processors is further configured to, after generating the integrated multilayer grid map:
iteratively perform an operation comprising:
generating a feedback value for each of the plurality of connection target groups based on the integrated multilayer grid map,
additionally updating an individual multilayer grid map for each of the plurality of connection target groups based on the feedback value and the routability, and
updating the integrated multilayer grid map, based on the additionally updated individual multilayer grid map for each of the plurality of connection target groups; and
determine the path routing area of each of the plurality of connection target groups in each layer in the multilayer structure based on the integrated multilayer grid map updated by the iterative performance.

11. The segmentation apparatus of claim 10, wherein the feedback value for a first connection target group, among the plurality of connection target groups, includes a probability that each grid cell in an individual multilayer grid map for the first connection target group is included in a path routing area of the first connection target group and a probability that each grid cell in an individual multilayer grid map for the first connection target group is included in a path routing area of the remaining connection target groups.

12. The segmentation apparatus of claim 9, wherein the one or more processors calculate the routability using an automatic routing agent and update the value of each grid cell in the individual multilayer grid map for each of the plurality of connection target groups to improve the routability for the corresponding connection target group.

13. The segmentation apparatus of claim 9, wherein the individual multilayer grid map comprises, as the value of the grid cell, a probability that each grid cell is included in a path routing area of the corresponding path routing group and a probability that each grid cell is included in a path routing area of the remaining path routing groups excluding the corresponding path routing group.

14. The segmentation apparatus of claim 9, wherein the one or more processors is further configured to:
extract values of grid cells at the same location as that of each grid cell included in the integrated multilayer grid map from each updated individual multilayer grid map for each of the plurality of connection target groups;
integrate the extracted values of the grid cells; and
determine the value of each grid cell included in the integrated multilayer grid map based on the integrated values of the grid cells.

15. The segmentation apparatus of claim 14, wherein the one or more processors determine the value of each grid cell included in the integrated multilayer grid map so that a boundary value of the path routing area allocated to each of the plurality of connection target groups is maximized, when each grid cell in the integrated multilayer grid map is allocated to the path routing area, among the plurality of connection target groups, based on the value of each grid cell included in the integrated multilayer grid map.

16. The segmentation apparatus of claim 9, wherein the one or more processors determine the initial probability based on positions of components included in the corresponding connection target group and positions of components included in each of the remaining connection target groups, among a plurality of components included in the multilayer structure.

* * * * *